US010044590B2

United States Patent
Ho (10) Patent No.: US 10,044,590 B2
(45) Date of Patent: Aug. 7, 2018

(54) METHOD OF EFFECTIVE RETAINING OF NAT CHANNEL SERVICE

(71) Applicants: ThroughTek Technology (ShenZhen) Co., Ltd., Shenzhen (CN); ThroughTek Co., Ltd., Taipei (TW)

(72) Inventor: Wen-Kai Ho, Taipei (TW)

(73) Assignee: Throughtek Technology (Shenzhen) Co., Ltd., Taipei (TW)

( * ) Notice: Subject to any disclaimer, the term of this patent is extended or adjusted under 35 U.S.C. 154(b) by 695 days.

(21) Appl. No.: 14/514,405

(22) Filed: Oct. 15, 2014

(65) Prior Publication Data

US 2016/0006690 A1   Jan. 7, 2016

(30) Foreign Application Priority Data

Jul. 4, 2014 (TW) .............................. 103123105 A (51) Int. Cl.
*H04L 12/26* (2006.01)
*H04L 29/12* (2006.01)

(52) U.S. Cl.
CPC .......... *H04L 43/10* (2013.01); *H04L 61/2514* (2013.01); *H04L 61/2517* (2013.01); *H04L 61/2553* (2013.01)

(58) Field of Classification Search
CPC ....................................................... H04L 43/10

USPC ......................................................... 709/223
See application file for complete search history.

(56) References Cited

U.S. PATENT DOCUMENTS

| 2009/0323632 A1* | 12/2009 | Nix | ...................... H04L 29/125 370/331 |
| 2010/0124191 A1* | 5/2010 | Vos | ................... H04L 29/12367 370/328 |
| 2011/0252079 A1* | 10/2011 | Werner | ................. H04L 29/125 709/202 |

FOREIGN PATENT DOCUMENTS

| CN | 101800683 A | 8/2010 |
| TW | 200843418 A | 11/2008 |

* cited by examiner

*Primary Examiner* — Vivek Srivastava
*Assistant Examiner* — Sibte Bukhari
(74) *Attorney, Agent, or Firm* — Rosenberg, Klein & Lee (57) ABSTRACT

A method of effective retaining of NAT channel service is provided. The method is applicable to a network system comprising at least one intranet device, a NAT network device and at least one server, in which the NAT network device is allocated with a plurality of NAT channel ports. The intranet device operates a process for detecting a valid period of the NAT channel with respect to the server via the NAT channel ports. The intranet device periodically transmits a packet, within the valid period of the NAT channel, to the server via the NAT channel ports so as to allow each NAT channel to constantly retain active to provide network transmission service.

10 Claims, 12 Drawing Sheets

METHOD OF EFFECTIVE RETAINING OF NAT CHANNEL SERVICE

CROSS-REFERENCE TO RELATED APPLICATIONS

This non-provisional application claims priority claim under 35 U.S.C. § 119(a) on Taiwan Patent Application No. 103123105 filed Jul. 4, 2014, the entire contents of which are incorporated herein by reference.

FIELD OF THE INVENTION

The present invention relates to a method of effective retaining of NAT channel service and, more particularly, to a method of retaining NAT channel service that uses a detected valid period of the NAT channel for periodically sending a packet via the NAT channel port.

BACKGROUND

The growing with every passing day of the Internet has made applications and information of network be an indispensable part of daily life. The public IP of the Internet, however, is limited in number and therefore NAT (network address translation) has been developed to accommodate more computer devices to access the Internet. The technique of NAT allows each computer device in a private network to share a public IP in a form of IPv4 or IPv6. By way of a network device equipped with NAT function, computer devices in a private network can access the Internet.

Figure 1:
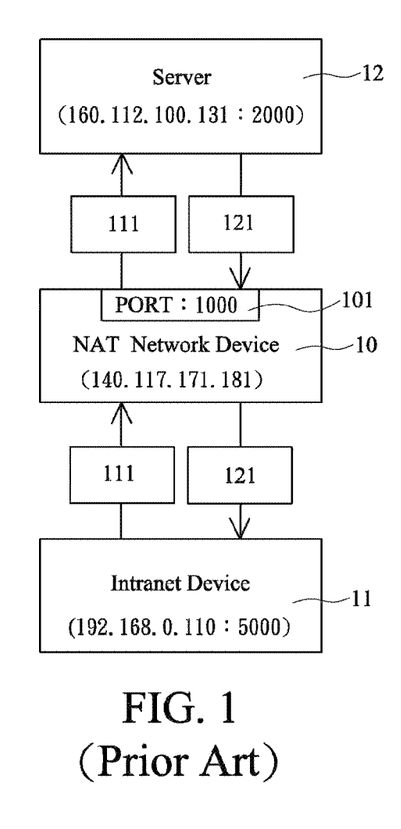
FIG. 1 is a system diagram of a network system in the art.

Referring to FIG. 1 there is shown a system diagram of a typical network system. As shown in FIG. 1, the network system comprises a NAT network device 10, at least one intranet device 11, and an internet server 12. The NAT network device 10 has a public IP, such as 140.117.171.181, the server 12 has another public IP and port, such as 160.112.100.131:1000, and the intranet device 11 has a private IP and port, such as 192.168.0.100:5000.

The NAT network device 10 is configured to establish a NAT channel between the intranet device 11 and the server 12, and the NAT channel is allocated with a NAT channel port 101 (e.g., port 1000). The NAT channel port 101 is mapped to the private IP and port of the intranet device 11. Before a registered packet 111 can be sent to the server 12 by the intranet device 11, the registered packet 111 is first transmitted to the NAT channel port 101 of the NAT network device 10. The NAT network device 10 translates the source IP and port (i.e., the private IP and port of the intranet device 11) of the registered packet 111 into the public IP and port of the NAT network device 10 (e.g., translating 192.168.0.100:5000 into 140.117.171.181:1000), and then transmits the registered packet 111 to the server 12 via the NAT channel port 101. Similarly, before a response packet 121 can be sent back to the intranet device 11 by the server 12, the response packet 121 is first transmitted to the NAT channel port 101 of the NAT network device. The NAT network device 10 translates the destination IP and port (i.e., the public IP and port of the NAT network device 10) of the response packet 121 into the private IP and port of the intranet device 11 (e.g., translating 140.117.171.181:1000 into 192.168.0.100:5000), and then transmits the response packet 121 to the intranet device 11. Hence, the network connection and packet transmission between the intranet device 11 and the server 12 are made possible by way of the NAT channel established by the NAT network device 10.

Further, the NAT network device 10 voluntarily detects whether the intranet device 11 continues to send packets via the NAT channel port 101. If no any packet is sent to the server 12 by the intranet device 11 via the NAT channel port 101 after a valid period of the NAT channel elapses, the NAT network device 10 voluntarily shuts down the NAT channel between the intranet device 11 and the server 12, thereby cutting off the network connection therebetween.

There does not exist a fixed nominal value for the valid period of the NAT channel, and therefore, in order to retain the NAT channel service, the intranet device 11 in the art frequently sends a test packet to the server 12 via the NAT channel port 101, for example, the intranet device 11 may send a test packet to the server 12 every 10 sec via the NAT channel port 101. However, this approach not only increases the workload of the server 12, but takes up some portions of the bandwidth of the NAT network device 10 due to frequent transmission of the test packet, which affects the data transmission in practice. It is also an adverse to the operation of the network system in general.

SUMMARY

An object of the present invention is to provide a method of effective retaining of NAT channel service, in which a valid period of the NAT channel is detected. As long as an intranet device under a NAT architecture periodically sends any packet, within the valid period of the NAT channel, to the server via the NAT channel port, the NAT channel corresponding to the NAT channel port constantly retains active to provide network transmission service.

An object of the present invention is to provide a method of effective retaining of NAT channel service, in which a NAT architecture type is detected. As long as the NAT architecture is detected to be of a full cone type, an intranet device under the NAT architecture can periodically send packets, based on a predetermined cycle time for sending packet, to an arbitrary server, internet device, or IP address, the NAT channel corresponding to the NAT channel port constantly retains active to provide network transmission service.

To achieve the aforementioned objects, the present invention provides a method of effective retaining of NAT (network address translation) channel service. The method is applicable to a network system comprising at least one intranet device, a NAT network device, and at least one server, in which the NAT network device is allocated with a first NAT channel port and a second NAT channel port, and the method comprises the steps, performed by the intranet device, of: operating a process for detecting a valid period of the NAT channel including the steps of: sending a first packet to the first server via the first NAT channel port; recording the time that the first packet is sent; periodically sending a second packet, in every predetermined time interval, to the first server via the second NAT channel port; receiving a response packet sent from the first server respectively via the first NAT channel port and the second NAT channel port in submission by periodically sending the second packet; determining whether to continue to receive the response packet via the first NAT channel port, and if not, recording the time that the response packet is not received; and computing the time duration between the time at which the response packet is not received and the time at which the first packet is sent so as to obtain a valid period of the NAT channel; and periodically sending any packet, based on the detected valid period of the NAT channel, to the first server via the first NAT channel port, the second NAT channel port, or other NAT channel port so as to retain the service provided by each NAT channel.

In one embodiment of the present invention, the network system comprises a plurality of first servers, in which the intranet device sets up a time interval of sending packet respectively for each first server and periodically sends the second packet, based on the time interval of sending packet corresponding to each first server, to each first server.

In one embodiment of the present invention, the method further includes the step, before the step of operating the process for detecting the valid period of the NAT channel by the intranet device, of: inquiring whether other intranet device has operated or is operating a process for detecting the valid period of the NAT channel, and if yes, the intranet device suspending the process for detecting the valid period of the NAT channel and receiving the valid period of the NAT channel from other intranet device, and if no other intranet device has operated or is operating the process for detecting the valid period of the NAT channel, the intranet device operating the process for detecting the valid period of the NAT channel so as to obtain the valid period of the NAT channel.

In one embodiment of the present invention, the intranet device communicates with the first server, an arbitrary internet device, or an arbitrary IP address via the first NAT channel port, the second NAT channel port, or other NAT channel port. When the port number of the first NAT channel port, the second NAT channel port, or other NAT channel port changes, the intranet device operates the process for detecting the valid period of the NAT channel again.

In one embodiment of the present invention, the network system further comprises at least one second server, in which the NAT network device is further allocated with a third NAT channel port, and the intranet device is in normal network operation with the second server via the third NAT channel port.

In one embodiment of the present invention, the network system further comprises at least one second server, in which the intranet device is in normal network operation with the second server via the second NAT channel port.

In one embodiment of the present invention, wherein a safe valid period of the NAT channel is obtained by the valid period of the NAT channel minus an estimated error value, and the intranet device periodically sends any packet, based on the safe valid period of the NAT channel, to the first server via the first NAT channel port, the second NAT channel port, or other NAT channel port.

In one embodiment of the present invention, the method further include one step, performed by the intranet device, of: detecting whether the NAT network device is a full cone type of NAT network device, and if the NAT network device is not of a full cone type, operating the process for detecting the valid period of the NAT channel, and if the NAT network device is of a full cone type, operating a process for arbitrarily sending packet.

In one embodiment of the present invention, the step of operating the process for arbitrarily sending packet, performed by the intranet device, comprises the steps of: registering in the first server by sending a third packet to the first server via the first NAT channel port; predetermining a cycle time of sending packet; and arbitrarily sending a fourth packet, based on the cycle time of sending packet, to the first server, an arbitrary internet device, or an arbitrary IP address via the first NAT channel port so as to allow the NAT channel of the first NAT channel port to retain service.

The present invention further provides a method of effective retaining of NAT channel service. The method is applicable to a network system comprising at least one intranet device, a NAT network device, and at least one first server, in which the NAT network device is of a full cone type and allocated with at least one first NAT channel port. The method includes the steps, performed by the intranet device, of: operating a process for arbitrarily sending packet comprising the steps of: registering in the first server by sending a third packet to the first server via the NAT channel port; predetermining a cycle time of sending packet; and arbitrarily sending a fourth packet, based on the cycle of sending a packet, to the first server, an arbitrary internet device, or an arbitrary IP address via the first NAT channel port so that the NAT channel of the first NAT channel port is able to retain service.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 2:
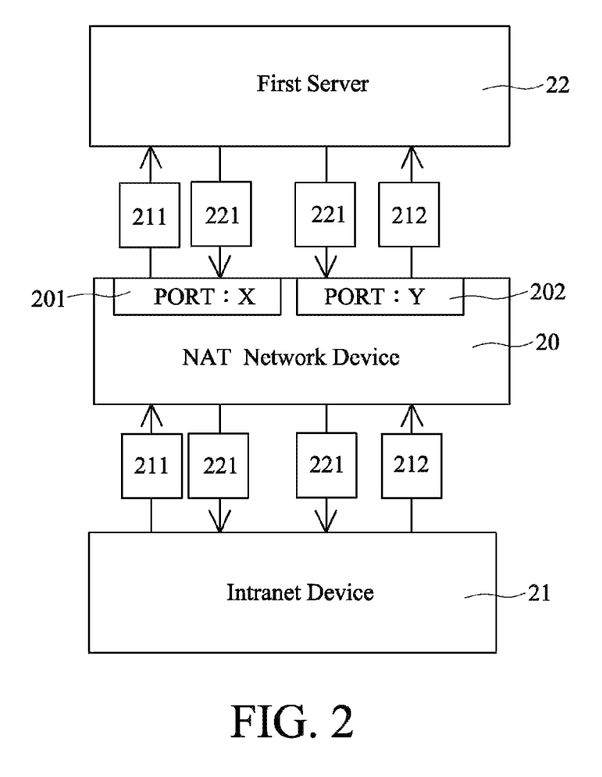
FIG. 2 is a system diagram of a network system in accordance with an embodiment of the present invention.

Referring to FIG. 2 there is shown a system diagram of a network system in accordance with an embodiment of the present invention. As shown in FIG. 2, the network system comprises a NAT network device 20, at least one intranet device 21, and a first server 22 of external network. The NAT network device 20 may be a router, a gateway, or a wireless AP router, and the intranet device 21 may be a computer or a mobile phone.

The NAT network device 20 can establish multiple NAT channels between the intranet device 21 and the first server 22, and each of the NAT channels is respectively bound with a first NAT channel port 201 (e.g., Port X) and a second NAT channel port 202 (e.g., Port Y). In the present embodiment, the intranet device 21 operates a process for detecting a valid period of the NAT channel via the two NAT channel ports 201, 202.

Figure 3:
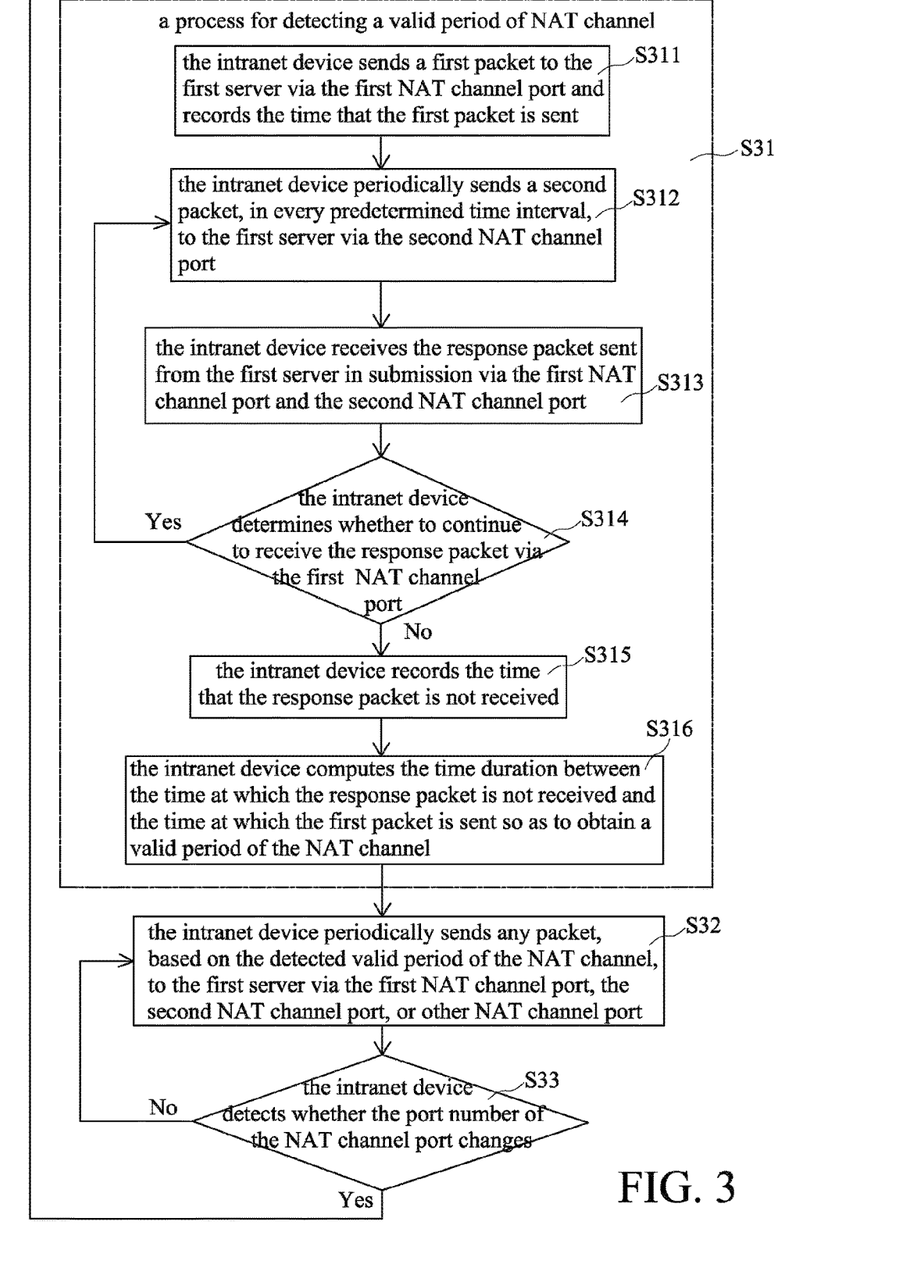
FIG. 3 is a flowchart in accordance with an embodiment of the method of effective retaining of NAT channel service of the present invention.

Continued with reference with FIG. 3, there is shown a flowchart in accordance with an embodiment of the method of effective retaining of NAT channel service of the present invention. This method is applicable to a network system. To begin with, in step S31, the intranet device 21 operates a process of detecting a valid period of the NAT channel as follows: in step S311, the intranet device 21 sends a first packet 211 to the first server 22 via the first NAT channel port 201 and records the time $T_0$ that the first packet 211 is sent. In this embodiment, the first packet 211 may be a login packet. Upon receiving the first packet 211, the first server 22 optionally sends back a response packet to the intranet device 21 via the first channel port 201 in order to confirm the availability of the first NAT channel port 201.

In step S312, the intranet device 21 periodically sends a second packet 212, in every predetermined time interval (e.g., every one sec), to the first server 22 via the second NAT channel port 202. In this embodiment, the second packet 212 may be a command packet.

In step S313, upon receiving the second packet 212 at each time point, the first server 22 subsequently sends back a response packet 221 to the first NAT channel port 201 and the second NAT channel port 202. Hence, the intranet device 21 receives the response packet 221 sent from the first server 22 in submission via the first NAT channel port 201 and the second NAT channel port 202.

Next, in step S314, the intranet device 21 determines whether to continue to receive the response packet 221, sent from the first server 22, via the first NAT channel port 201. If yes, then go back to the step S312. If no, then continue to step S315, in which the intranet device 21 immediately records the time $T_1$ that the response packet 221 is not received by the first NAT channel port 201.

In step S316, the intranet device 21 computes the time duration between the time $T_1$ at which the response packet is not received and the time $T_0$ at which the first packet is sent, in order to obtain a valid period of the NAT channel ($Tx=T_1-T_0$) and complete the process of detecting the valid period of the NAT channel.

After completing the process for detecting the valid of the NAT channel, the intranet device 21 continues to perform step S32. In this step S32, the intranet device 21 periodically sends any packet (e.g., a test packet), based on the detected valid period of the NAT channel (Tx), to the first server 22 or a specific internet device via the first NAT channel port 201, in such a way that the NAT channel corresponding to the NAT channel ports 201, 202 can retain network service. For example, if the valid period of the NAT channel (Tx) is detected as 60 sec, then the intranet device 21 can periodically sends a test packet, in every 60 sec, to the first server 22 or a specific internet device via the NAT channel ports 201, 202, and the NAT channel corresponding to the NAT channel ports 201, 202 can retain active to provide normal network service.

By detecting the valid period of the NAT channel (Tx), the object of constantly retaining of the NAT channel service is achieved without the intranet device 21 frequently sending test packets to the first server 22 via the NAT channel ports 201, 202. This embodiment, once implemented, not only reduces the workload of the first server 22, but also avoids portions of bandwidth of the NAT network device 20 being occupied due to frequent transmission of test packets, which adversely affects data transmission in practice.

Further, in one embodiment of this invention, after the intranet device completes the process of detecting the valid period of the NAT channel (Tx), the first NAT channel port 201 and the second NAT channel port 202 may be optionally used as ports for network communication. Hence, the intranet device 21 of this invention communicates with the first server 22, an arbitrary internet device, or an arbitrary IP address via the first NAT channel port 201, the second NAT channel port 202, or other NAT channel port.

Continued with the above description, the method of effective retaining of the NAT channel further comprises one step S33. In the step S33, the intranet device 21 keeps detecting whether the port number of the NAT channel port (such as the first NAT channel port 201, the second NAT channel port 202, or other NAT channel port) changes. If the intranet device 21 detects that the port number of the NAT channel port is not changed, go back to the step S32. If the intranet device 21 detects that the port number of the NAT channel port is changed, go back to the step S31 to obtain the valid period of the NAT channel (Tx) again.

Figure 4:
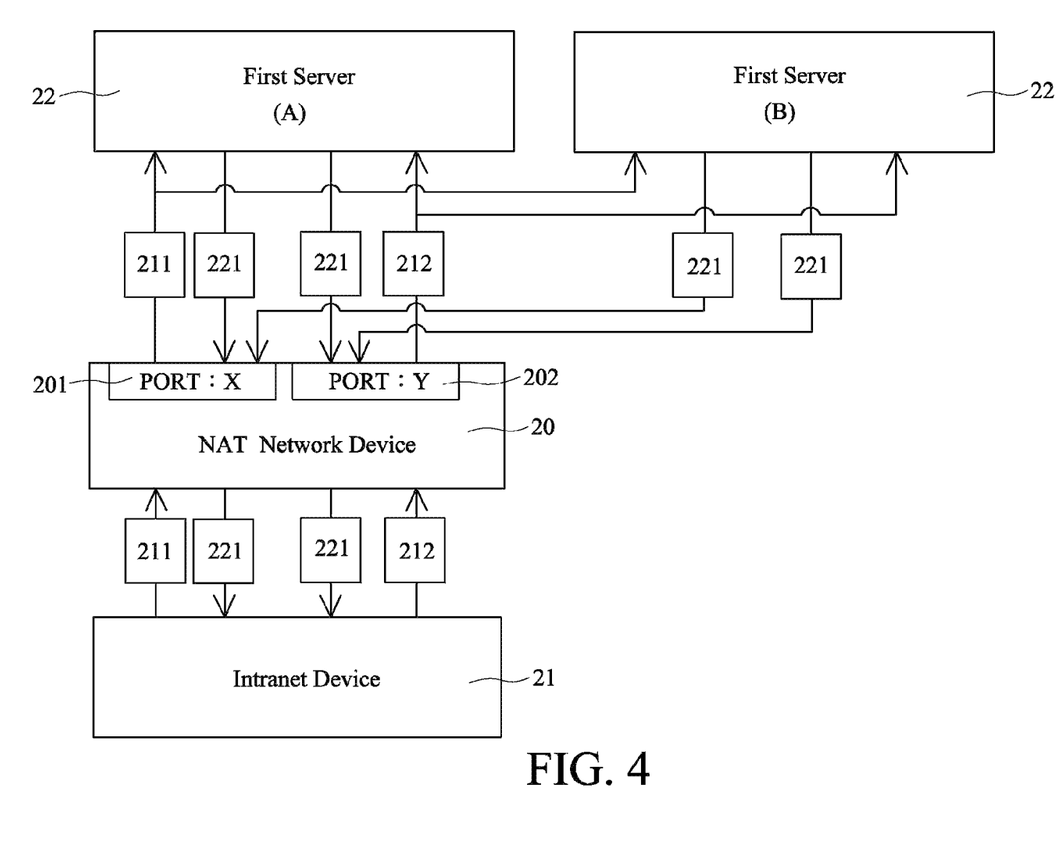
FIG. 4 is a system diagram of a network system in accordance with another embodiment of the present invention.

Referring to FIG. 4 there is shown a system diagram of a network system in accordance with another embodiment of the present invention. In this embodiment, the intranet device 21 may further adopt multiple first servers 22 (e.g., the first servers A, B) as the detecting targets in the process for detecting the valid period of the NAT channel.

Figure 5:
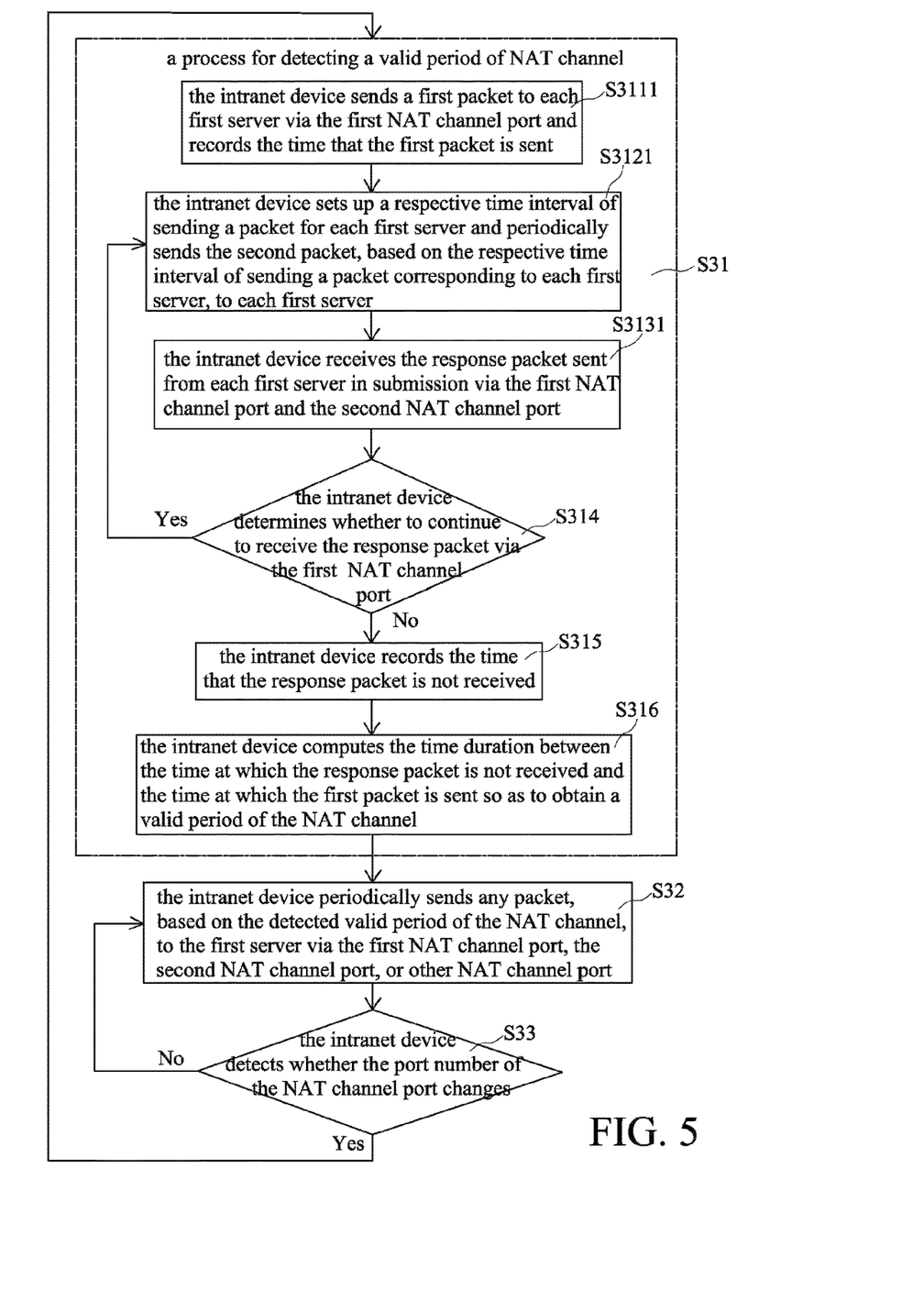
FIG. 5 is a flowchart of the method of effective retaining of NAT channel service in accordance with another embodiment of the present invention.

Refer to FIG. 4 with reference to the flowchart in FIG. 5. The intranet device 21 operates the process for detecting the valid period of the NAT channel, as shown in step S31, is as follows. To begin with, in step S3111, the intranet device 21 sends a first packet 211 to each first server 22 via the first NAT channel port 201 and records the time that the first packet 211 is sent. In step S3121, the intranet device 21 sets up a respective time interval of sending a packet for each first server 22 and periodically sends the second packet 212, based on the respective time interval of sending a packet corresponding to each first server 22, to each first server 22.

In one embodiment of this invention, the intranet device 21 may set up the same time interval of sending packet for each first server 22, for example, the intranet device 21 sets up the time interval of 1 sec for the first servers A, B. In another embodiment of this invention, the intranet device 21 may set up different time intervals of sending a packet for respective first servers 22, for example, the intranet device 21 sets up the time interval of 2 sec for the first server A and sets up the time interval of 3 sec for the first server B.

Next, in step S3131, after the first server (A) 22 and the first server (B) 22 receive the second packet 212 sent from the intranet device 21 at respective time points, the first server (A) 22 and the first server (B) 22 individually send back the response packet 221 to the first NAT channel port 201 and the second NAT channel port 202, respectively. Hence, the intranet device 21 receives the response packets 221 sent from the first server (A) 22 and/or the first server (B) 22 in submission via the first NAT channel port 201 and the second NAT channel port 202. The method continues to step S314, followed by step S315 and step S316 (the steps S314, S315, and S316 are identical to the steps shown in FIG. 3), and finally, the valid period of the NAT channel (Tx) is obtained.

By multiple first servers 22 being adopted as the detecting targets, when the network connection between the intranet device 21 and one of the first servers 22 is not stable, the intranet device 21 can still receive the response packet 221 from the other first server 22, thereby accurately detecting the valid period of the NAT channel (Tx).

In another embodiment of this invention, the valid period of the NAT channel (Tx) that the intranet device 21 detected may not be reliable due to reasons such as errors in detection, delay in network transmission, and slow response from the server. Hence, in order to prevent the NAT channel being shut down during the valid period of the NAT channel (Tx) when the intranet device 21 sends packets, the intranet device 21 can set up estimated error values $T_{YA}$, $T_{YB}$ respectively for the first servers (A), (B) 22. After detecting the valid period of the NAT channel (Tx), a safe valid period of the NAT channel (i.e., $T_{ZA}=Tx-T_{YA}$ or $T_{ZB}=Tx-T_{YB}$) may be obtained by the valid period of the NAT channel (Tx) minus the estimated error value ($T_{YA}$ or $T_{YB}$). Afterwards, the intranet device 21 periodically sends any packet to the first server (A) 22 or the first server (B) 22, based on the safe valid period of the NAT channel ($T_{ZA}$ or $T_{ZB}$), via the respective NAT channel ports 201, 202, reducing the risk of each of the NAT channels being shut down.

Figure 6:
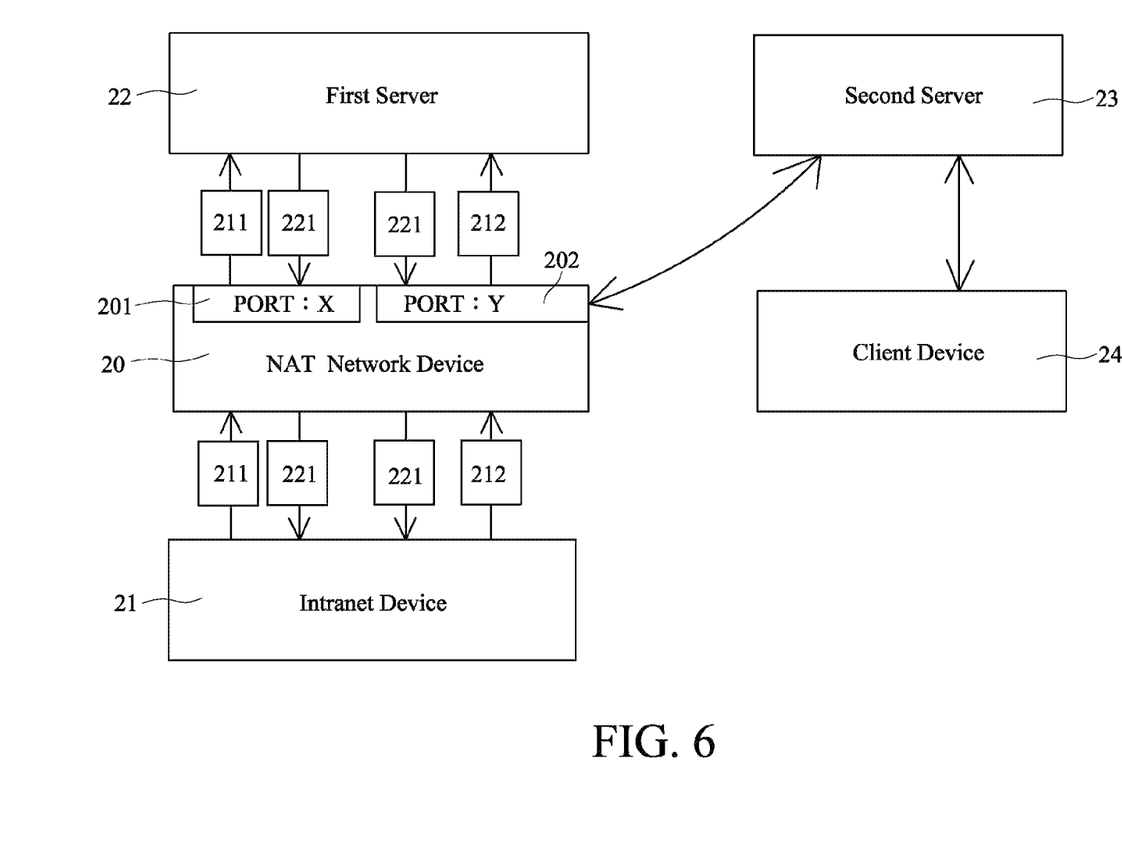
FIG. 6 is a system diagram of a network system in accordance with another embodiment of the present invention.

Referring to FIG. 6, there is shown a system diagram of a network system in accordance with another embodiment of the present invention. The network system further comprises a second server 23. The intranet device 21 may send a login packet to the second server 23 via the second NAT channel port 202, in order to establish a network connection with the second server 23 for normal network operations.

If a remote client device 24 wants to transmit message packets to the intranet device 21, the message packets can be transmitted by way of the second server 23. Alternatively, the client device 24 can establish a P2P (point-to-point) network connection with a hole-punching approach by way of the second server 23 so as to allow the client device 24 to directly transmit message packets to the intranet device 21.

Figure 7:
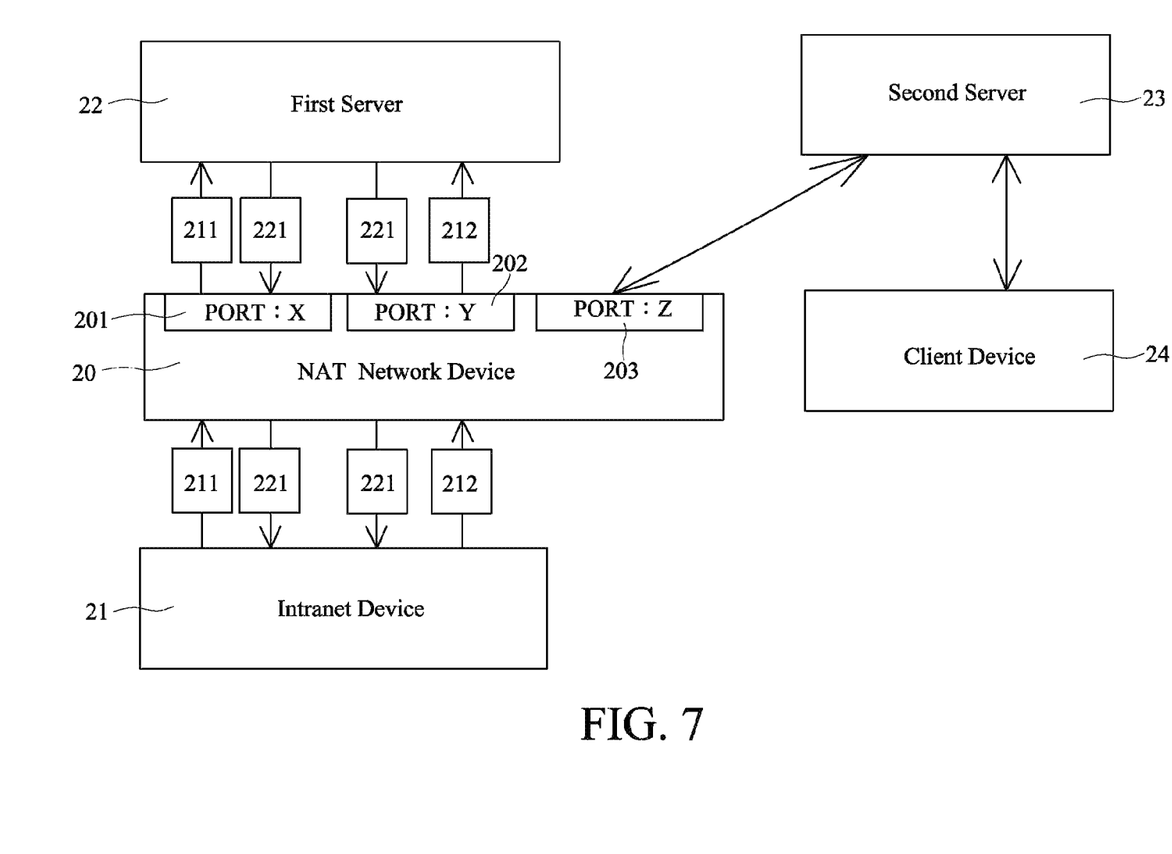
FIG. 7 is a system diagram of a network system in accordance with another embodiment of the present invention.

Referring to FIG. 7, in another embodiment of this invention, in order to avoid the second NAT channel port 202, which is used in the process of detecting the valid period of the NAT channel, to affect the normal network operations of the intranet device 21, the NAT network device 20 may be further allocated with a third NAT channel port 203. The intranet device 21 can establish a network connection with the second server 23 and/or the client device 24 via the third NAT channel port 203 for normal network operations.

Figure 8:
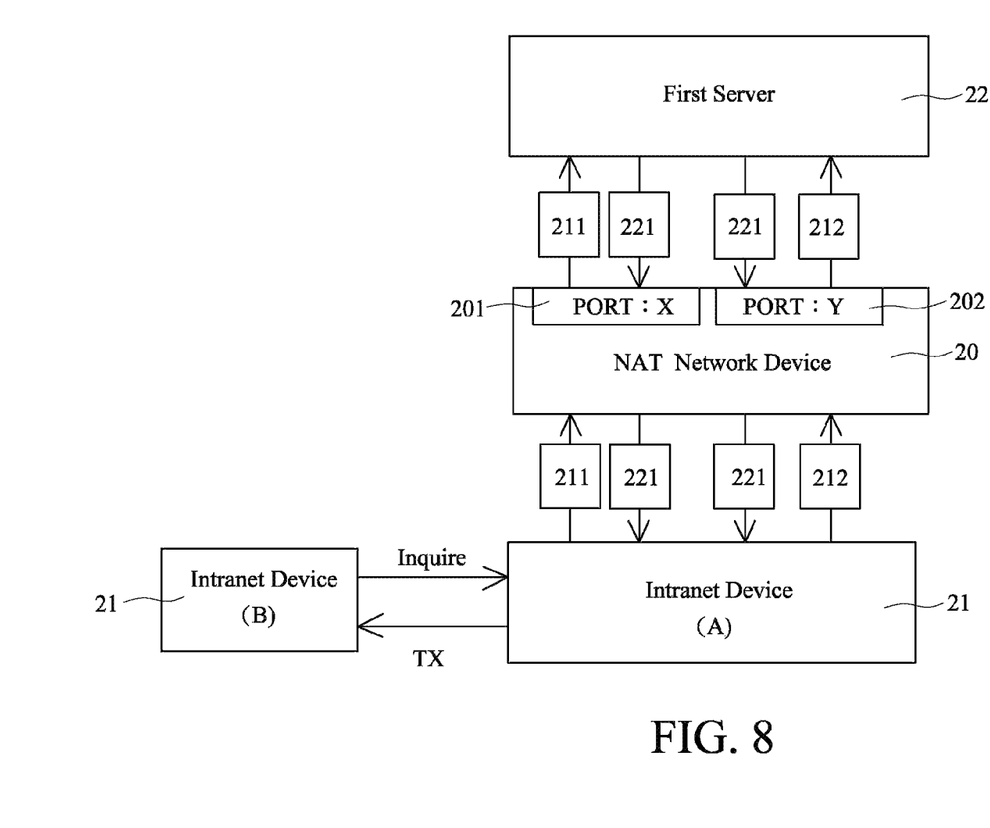
FIG. 8 is a system diagram of a network system in accordance with another embodiment of the present invention.
Figure 9:
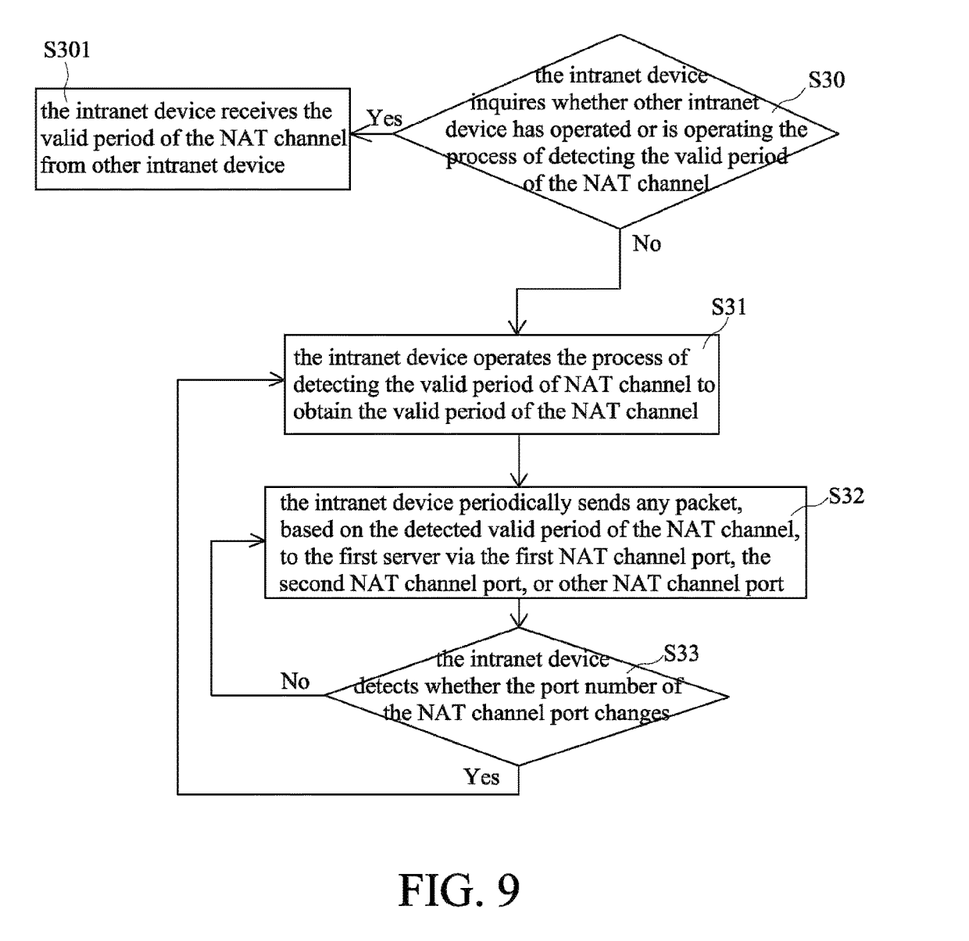
FIG. 9 is a flowchart of the method of effective retaining of NAT channel service in accordance with another embodiment of the present invention.

Referring to FIGS. 8 and 9, there are shown a system diagram of a network system and a flowchart of the method of effective retaining of NAT channel service in accordance with another embodiment of the present invention. Compared to the steps of method shown in FIGS. 3 and 5, the intranet device 21 of the present embodiment further performs a step S30 before the step S31. In the step S30, the intranet device 21 inquires whether other intranet device 21 has operated or is operating the process for detecting the valid period of the NAT channel, and if yes, step S301 is performed, in which the intranet device 21 (e.g., the intranet device (B)) receives the valid period of the NAT channel (Tx) from other intranet device 21 (e.g., the intranet device (A)); if no other intranet device has operated or is operating the process of detecting a valid period of the NAT channel, the intranet device 21 (e.g., the intranet device (A)) operates the process for detecting the valid period of the NAT channel to obtain the valid period of the NAT channel (Tx).

Figure 10:
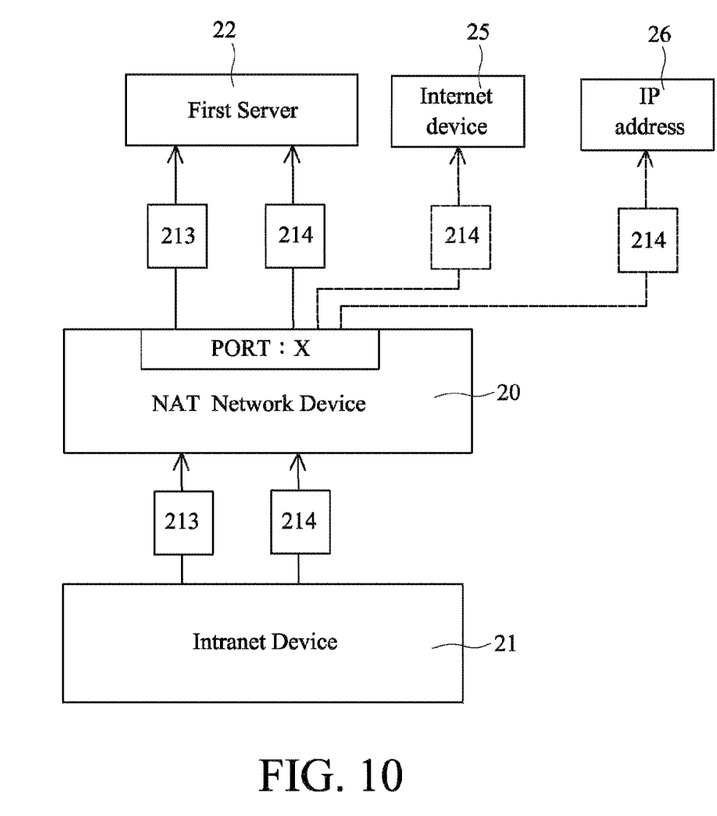
FIG. 10 is a system diagram of a network system in accordance with another embodiment of the present invention.

Referring to FIG. 10 there is shown a system diagram of a network system in accordance with another embodiment of the present invention. In this embodiment, the NAT network device 20 may be a full cone type of NAT network device. The intranet device 21 of this embodiment operates a process of arbitrarily sending packet by way of the NAT network device 20 of full cone type.

Figure 11:
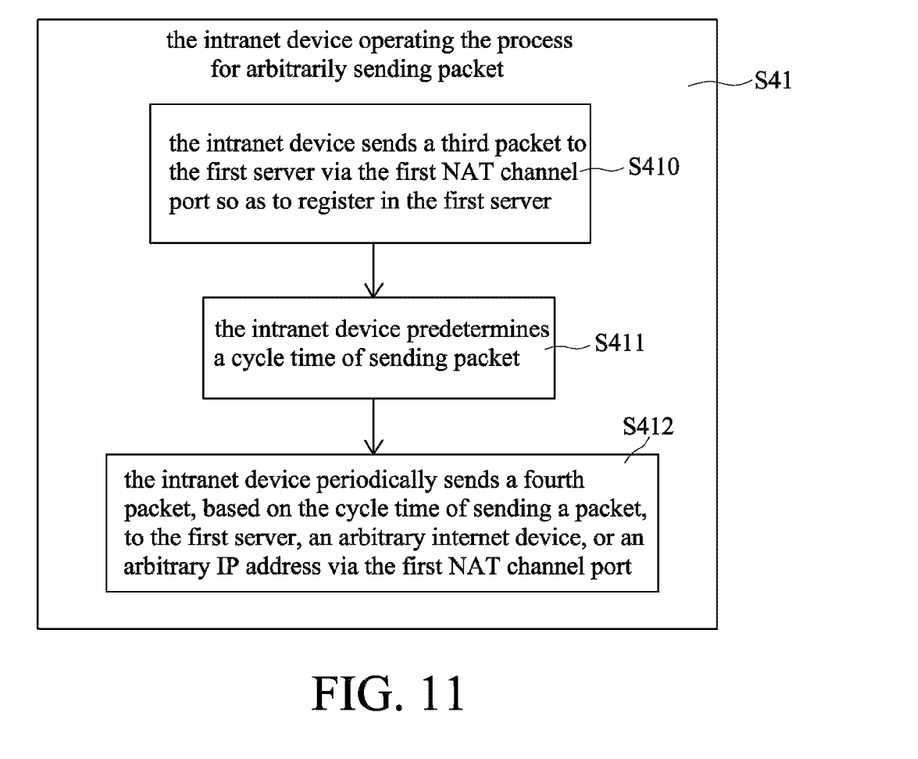
FIG. 11 is a flowchart of the method of effective retaining of NAT channel service in accordance with another embodiment of the present invention.

Refer to FIG. 10 with reference to the flowchart shown in FIG. 11. The intranet device 21 operates the process for arbitrarily sending packet, as shown in step S41, is as follows. To begin with, in step S410, the intranet device 21 sends a third packet 213 (e.g., a registered packet) to the first server 22 via the first NAT channel port 201, in order to register in the first server 22. In step S411, the intranet device 21 predetermines a cycle time of sending packet of which the time is, for example, 30 sec. Next, in step S412, the intranet device 21 periodically sends a fourth packet 214 arbitrarily (e.g., a test packet), based on the cycle time of sending packet, to the first server 22, an arbitrary internet device 25, or an arbitrary IP address 26 via the first NAT channel port 201 so as to allow the NAT channel of the first NAT channel port 201 to constantly retain active to provide network transmission service.

Figure 12:
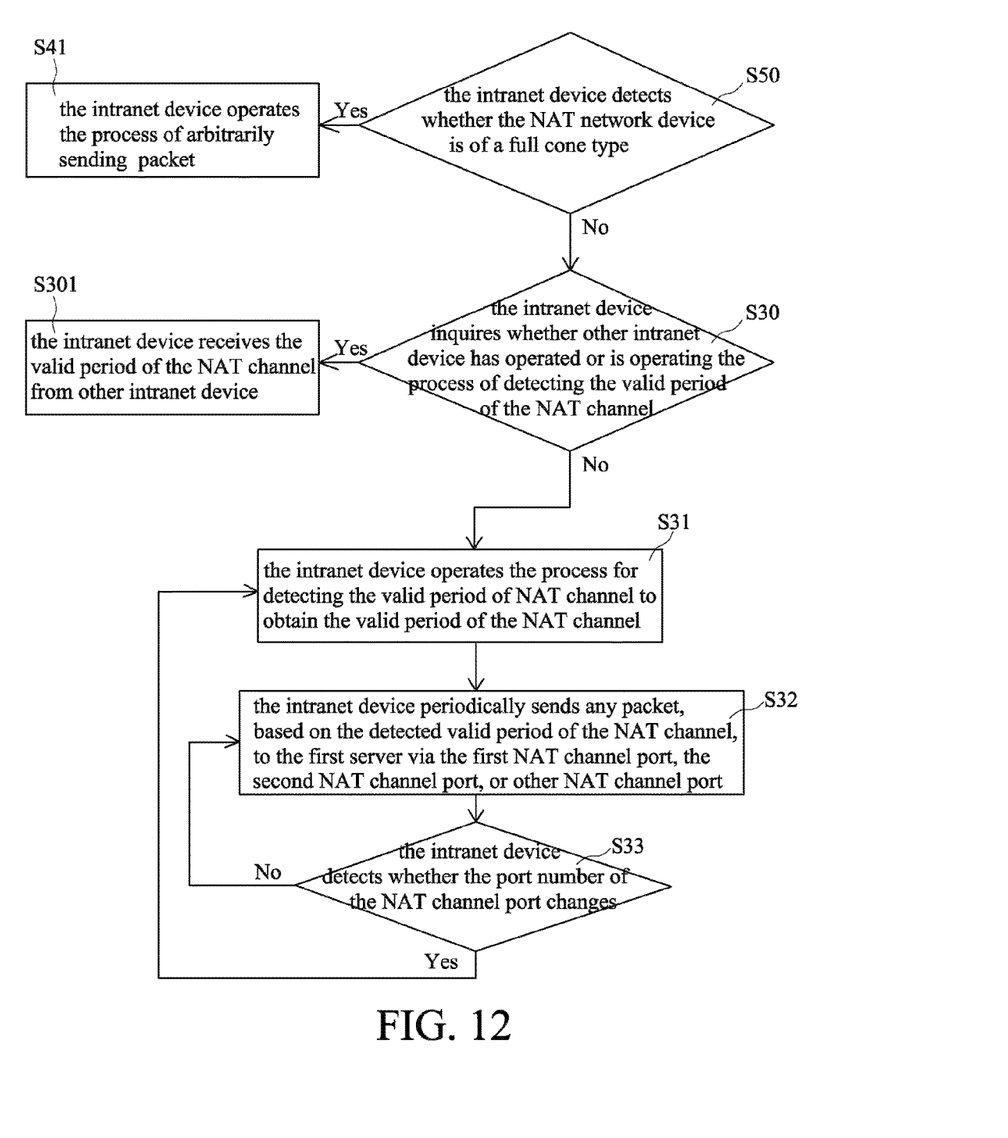
FIG. 12 is a flowchart of the method of effective retaining of NAT channel service in accordance with another embodiment of the present invention.

Referring to FIG. 12 there is shown a flowchart of the method of effective retaining of NAT channel service in accordance with another embodiment of the present invention. Compared to the steps of method shown in FIG. 9, the method of the present embodiment further comprises one step S50. In the step S50, the intranet device 21 detects whether the NAT network device 20 is of a full cone type. If the NAT network device 20 is a full cone type of NAT network device, the step S41 is performed, in which the intranet device 21 operates the process of arbitrarily sending packet, periodically sending a test packet 214 arbitrarily to the first server 22, an arbitrary internet device 25, or an arbitrary IP address 26 via the first NAT channel port 201, so that the NAT channel of the first NAT channel port 201 may constantly retain active to provide network transmission service. On the contrary, if the NAT network device 20 is other type of NAT network device (e.g., restricted cone, port restricted cone, or symmetric), the step S30 is performed, in which the intranet device 21 inquires whether other intranet device 21 has operated or is operating the process of detecting the valid period of the NAT channel, and if yes, the step S301 is performed, in which the intranet device 21 receives the valid period of the NAT channel (Tx) from other intranet device 21; if no other intranet device 21 has operated or is operating the process for detecting the valid period of the NAT channel, the step S31 is performed, in which the intranet device 21 operates the process for detecting the valid period of the NAT channel so as to obtain the valid period of the NAT channel (Tx). Next, continuing to step S32, the intranet device 22 periodically sends packet, within the detected valid period of the NAT channel, to the first server 22 or other specific internet device via first NAT channel port 201, the second NAT channel port 202, or other NAT channel port, and thereby each NAT channel retaining active to provide network transmission service.

It is to be understood that the present invention is not limited to the embodiment(s) set forth and illustrated hereinabove, but encompasses any and all variations falling within the spirit and scope of this invention as defined by the appended claims and their equivalents.

What is claimed is:
1. A method of effective retaining of a NAT (network address translation) channel service applicable to a network system, the network system including at least one intranet device, a NAT network device and at least one first server, the NAT network device including at least a first NAT channel port and a second NAT channel port, the method performed by the intranet device and comprising:
   operating a process for detecting a valid period of the NAT channel, the process including:
      sending a first packet from the intranet device to the first server via the first NAT channel port of the NAT network device at a first time point,
      recording the first time point,
      receiving a first response packet responsive to the first packet from the first server via the first NAT channel port of the NAT network device,
      periodically sending a second packet from the intranet device to the first server via the second NAT channel port of the NAT network device, wherein the first NAT channel port is different from the second NAT channel port;
      receiving a second response packet responsive to each second packet from the first server via each of the first NAT channel port and the second NAT channel port of the NAT network device,
      determining at a second time point whether to continue to receive the second response packet via the first NAT channel port of the NAT network device, and if not, recording the second time point, wherein the first NAT channel port does not transmit packets to said first server during a time interval between said first time point and the recording of said second time point, and
      obtaining a valid period of the NAT channel between the first NAT channel port and the first server by subtracting the first time point from the second time point; and
   sending a channel retention packet during the detected valid period of the NAT channel to the first server via one of the NAT channel ports so as to retain the network service provided by the NAT channel.

2. The method as of claim 1, wherein the network system includes a plurality of first servers, and the intranet device sets up a time interval of sending packet respectively for each said first server and periodically sends the second packet, based on the time interval of sending packet corresponding to each said first server, to each said first server.

3. The method as of claim 1, further comprising, prior to the process for detecting the valid period of the NAT channel, inquiring whether any other the intranet device has operated or is operating the process for detecting the valid period of the NAT channel,
   wherein the process for detecting the valid period of the NAT channel is suspended if any other intranet device has operated or is operating the process for detecting the valid period of the NAT channel.

4. The method as of claim 1, wherein the intranet device communicates with the first server, an arbitrary internet device, or an arbitrary IP address via the first NAT channel port, the second NAT channel port, or other NAT channel port, and when the port number of the first NAT channel port, the second NAT channel port, or other NAT channel port changes, the intranet device repeats the process for detecting the valid period of the NAT channel.

5. The method as of claim 1, wherein the network system further includes at least one second server, the NAT network device further includes a third NAT channel port, and the intranet device is in normal network operation with the second server via the third NAT channel port.

6. The method as of claim 1, wherein the network system further includes at least one second server, and the intranet device is in normal network operation with the second server via the second NAT channel port.

7. The method as of claim 1, wherein a safe valid period of the NAT channel is obtained by the valid period of the NAT channel minus an estimated error value, and the intranet device sends a channel retention packet during the safe valid period of the NAT channel to the first server via one of the NAT channel ports.

8. The method as of claim 1, further comprising:
   detecting whether the NAT network device is a full cone type of NAT network device,
   suspending the process for detecting the valid period of the NAT channel if the NAT network device is of a full cone type, and
   arbitrarily sending a packet if the NAT network device is of a full cone type.

9. The method as of claim 8, wherein the arbitrary sending of the packet includes:
   registering in the first server by sending a third packet to the first server via the first NAT channel port;
   predetermining a cycle time of sending packet; and
   arbitrarily sending a fourth packet, based on the cycle time of sending packet, to the first server, an arbitrary internet device, or an arbitrary IP address via the first NAT channel port so as to allow the NAT channel of the first NAT channel port to retain service.

10. The method as of claim 8, further comprising, prior to the process for detecting the valid period of the NAT channel, inquiring whether any other the intranet device has operated or is operating the process for detecting the valid period of the NAT channel,
   wherein the process for detecting the valid period of the NAT channel is suspended if any other intranet device has operated or is operating the process for detecting the valid period of the NAT channel.

* * * * *